(12) United States Patent
Jungwirth

(10) Patent No.: US 10,264,650 B2
(45) Date of Patent: Apr. 16, 2019

(54) SYSTEM AND METHOD FOR CONTACTLESS ENERGY TRANSFER TO A MOVING PLATFORM

(71) Applicant: The Boeing Company, Chicago, IL (US)

(72) Inventor: Douglas R. Jungwirth, Porter Ranch, CA (US)

(73) Assignee: The Boeing Company, Chicago, IL (US)

(*) Notice: Subject to any disclaimer, the term of this patent is extended or adjusted under 35 U.S.C. 154(b) by 420 days.

(21) Appl. No.: 14/840,384

(22) Filed: Aug. 31, 2015

(65) Prior Publication Data
US 2017/0063100 A1     Mar. 2, 2017

(51) Int. Cl.
| | | |
|---|---|---|
| H04B 7/00 | (2006.01) |
| G01S 17/02 | (2006.01) |
| H01L 31/052 | (2014.01) |
| F21S 2/00 | (2016.01) |
| H02J 17/00 | (2006.01) |
| H05B 37/02 | (2006.01) |
| H02J 50/30 | (2016.01) |

(52) U.S. Cl.
CPC ......... *H05B 37/0218* (2013.01); *H02J 50/30* (2016.02)

(58) Field of Classification Search
CPC ........ H05B 37/0218; H02J 50/30; H02J 17/00
USPC .................................................. 307/89–111
See application file for complete search history.

(56) References Cited

U.S. PATENT DOCUMENTS

| | | | | |
|---|---|---|---|---|
| 4,701,674 A | * | 10/1987 | Oono .................... | G02B 26/121 |
| | | | | 235/454 |
| 5,821,728 A | * | 10/1998 | Schwind ............... | B60L 11/182 |
| | | | | 320/108 |

(Continued)

FOREIGN PATENT DOCUMENTS

| | | |
|---|---|---|
| JP | H03 56007 A | 3/1991 |
| JP | H04 251504 | 9/1992 |

(Continued)

OTHER PUBLICATIONS

Spectrolab Brochure—044975: 2V, Dual-junction GaAs Power Converter, dated Jun. 1, 2012.
Spectrolab Brochure—6V GaAs Dual Junction Laser Power Converter, undated.
PCT International Search Report and Written Opinion dated Oct. 18, 2016.

*Primary Examiner* — Brandon S Cole
(74) *Attorney, Agent, or Firm* — Toler Law Group, PC

(57) ABSTRACT

A contactless energy transfer system has a first stationary platform and a second movable platform. The first platform has at least one light source coupled to a power source. The second separate platform has at least one photovoltaic module mounted thereon. The at least one photovoltaic module is coupled to an energy storage system mounted on the second platform such that any light received at the photovoltaic module is converted to electrical energy stored in the energy storage system. The second platform is configured to move in close proximity to the first platform along a predetermined pathway. The predetermined pathway may be linear or rotary. The light sources are positioned and configured to direct light at the photovoltaic modules during a predetermined interval when the second platform is in close proximity to the first platform (for the linear pathway) or constantly or at predetermined intervals (for the rotatory pathway).

20 Claims, 6 Drawing Sheets

(56) References Cited

U.S. PATENT DOCUMENTS

| | | |
|---|---|---|
| 8,944,226 B2 | 2/2015 | Zengerle |
| 9,764,150 B2 * | 9/2017 | Loudin ................ A61N 1/3787 |
| 2002/0046763 A1 * | 4/2002 | Berrios ..................... H02J 7/35 |
| | | 136/244 |
| 2006/0239312 A1 * | 10/2006 | Kewitsch ............. H01S 5/0683 |
| | | 372/29.023 |
| 2010/0079011 A1 | 4/2010 | Hyde et al. |
| 2011/0278480 A1 | 11/2011 | Chan et al. |
| 2012/0097872 A1 * | 4/2012 | Ito ....................... G03G 15/0189 |
| | | 250/559.4 |
| 2012/0269517 A1 * | 10/2012 | Rastegar .............. H04B 10/807 |
| | | 398/130 |
| 2012/0322382 A1 * | 12/2012 | Toyoda ................... H02J 7/025 |
| | | 455/41.2 |
| 2013/0328416 A1 * | 12/2013 | Whitworth .............. H02J 17/00 |
| | | 307/149 |
| 2015/0219763 A1 * | 8/2015 | Nubling .................. G01S 17/42 |
| | | 250/221 |

FOREIGN PATENT DOCUMENTS

| | | |
|---|---|---|
| JP | H05 718 A | 1/1993 |
| JP | 2010166675 A | 7/2010 |
| WO | 2009083990 A2 | 7/2009 |
| WO | 2012172541 A1 | 12/2012 |

\* cited by examiner

SYSTEM AND METHOD FOR CONTACTLESS ENERGY TRANSFER TO A MOVING PLATFORM

FIELD

This disclosure relates generally to a system and method for contactless energy transfer from a source to a moving platform.

BACKGROUND

Many types of moving platforms require significant amounts of electrical energy. In some cases, the moving platform may move in a linear direction, as is the case with a train powered via an electrified third rail or an overhead catenary wire. In other cases, the moving platform may move in a rotary direction, as is the case with a rate table (i.e., a table configured to rotate at high speeds) which can be used for testing inertial components or systems which are powered via a slip ring or a spring-loaded contact coupled to the rotating table. In both cases, power is transferred from a stationary source to the moving platform via a moving direct contact (i.e., a metal contact attached to the moving platform that is pressed against a third rail, catenary wire or rotating slip ring coupled to a stationary source). This type of energy transfer system, requiring a moving direct contact, is subject to wear and limited life.

Furthermore, other types of systems including moving platforms may not allow any contact whatsoever between a moving platform and a stationary source of power. In one example, although a maglev train does not require external power for propulsion, a source of power may be required for internal electrical systems used for cabin lighting, etc. However, the high speeds achieved by maglev trains may preclude the use of a direct contact to transfer power to the moving maglev train and any type of direct contact energy transfer system would be subject to limited life as well due to wear.

Accordingly, there is a need for a system and method of energy transfer which overcomes the problems recited above.

SUMMARY

In a first aspect a contactless energy transfer system has a first platform and a second platform. The first platform has at least one light source coupled to a power source. The second platform is separate from the first platform and has at least one photovoltaic module mounted thereon. The at least one photovoltaic module is coupled to an energy storage system mounted on the second platform such that any light received at the photovoltaic module is converted to electrical energy stored in the energy storage system. The second platform is configured to move in close proximity to the first platform for a predetermined interval along a predetermined pathway. The at least one light source is positioned and configured to direct light at the at least one photovoltaic module during the predetermined interval.

The first platform may be stationary or moveable. The second platform may further include a first signal transmitter for outputting an activation signal, and the first platform may include a receiver configured to receive the activation signal and activate the at least one light source to output light. The second platform may further includes a second signal transmitter for outputting a deactivation signal, and the receiver on the first platform may be configured to receive the deactivation signal and deactivate the at least one light source to cease outputting light. The receiver on the first platform may be configured to deactivate the at least one light source to cease outputting light after a predetermined period of time. The first platform may include a sensor configured to detect when the second platform is in close proximity to the first platform and to activate the light source to output light while the second platform remains in close proximity to the first platform. Each of the at least one light sources may be a high-intensity light source. Each of the at least one photovoltaic module may be one or more laser power converters.

In a second aspect, a contactless energy transfer system has a first platform and a second platform. The first platform has at least one light source coupled to a power source. The second platform is separate from the first platform. The second platform has at least one photovoltaic module mounted thereon. The at least one photovoltaic module is coupled to an energy storage system mounted on the second platform such that any light received at the photovoltaic module is converted to electrical energy stored in the energy storage system. The second platform is configured to rotate around a fixed axis in close proximity to the first platform. The at least one light source is positioned and configured to direct light at the at least one photovoltaic module during rotation of the second platform.

The second platform may be a cylinder having an axis coincident with the fixed axis. The at least one photovoltaic module may be positioned on an outer periphery of the cylindrical second platform. The at least one light source may be positioned outside the outer periphery such that light output from the at least one light sources is directed at the at least one photovoltaic module. The second platform may alternatively have a surface perpendicular to the axis of rotation, with the at least one photovoltaic module positioned on the surface of the cylindrical second platform perpendicular to the axis of rotation and the at least one light source positioned such that light output from the at least one light source is directed at the at least one photovoltaic module. Each of the at least one light sources may be configured to activate to output light during rotation of the second platform. Alternatively, each of the at least one light sources may be is configured to activate to output light only for predetermined intervals during rotation of the second platform. Each of the at least one light source may be a high-intensity light source. Each of the at least one photovoltaic module may be one or more laser power converters.

In one further embodiment, the first platform may further comprise a first communications circuit, a first light detector coupled to the first communications circuit and centrally aligned with the fixed axis of the second platform, a fixed lens mounted perpendicular to and centrally aligned with the fixed axis of the second platform, the fixed lens between the light detector and the second platform. In addition, the second platform may further comprise a second communications circuit and a second light source coupled to the second communications circuit, the second light source mounted at a fixed distance from the fixed axis of the second platform, the second light source positioned to direct light though the fixed lens. Further, the fixed lens may be configured to direct the light from the second light source to the first light detector. Still further, the second communications circuit may be configured to provide a data stream to the second light source. Finally, the first communications circuit may be configured to receive the data stream from the first light detector.

In another further embodiment, the first platform may further comprise a first communications circuit, a first light source coupled to the first communications circuit and mounted at a fixed distance from the fixed axis of the second platform, a fixed lens mounted perpendicular to and centrally aligned with the fixed axis of the second platform, the fixed lens between the first light source and the second platform, the first light source positioned to direct light though the fixed lens. In addition, the second platform may further comprise a second communications circuit and a second light detector coupled to the second communications circuit, the second light detector centrally aligned with the fixed axis of the second platform. Further, the fixed lens may be configured to direct the light from the first light source to the second light detector. Still further, the first communications circuit may be configured to provide a data stream to the first light source. Finally, the second communications circuit may be configured to receive the data stream from the second light detector.

In a third aspect, a method of contactless energy transfer from a stationary platform to a moving platform. The moving platform is configured to move in a predetermined path in close proximity to the stationary platform. One or more light sources mounted on a stationary platform is activated to output light as a moving platform moves in close proximity to the stationary platform along the predetermined path. The light output from the one or more light sources on the stationary platform is received at one or more photovoltaic modules mounted on the moving platform as the moving platform moves in close proximity to the stationary platform along the predetermined path. The received light is converted to electrical energy at the one or more photovoltaic modules mounted on the moving platform as the moving platform moves in close proximity to the stationary platform along the predetermined path. The electrical energy is stored in an energy storage system on the moving platform.

The features, functions, and advantages that have been discussed can be achieved independently in various embodiments or may be combined in yet other embodiments, further details of which can be seen with reference to the following description and drawings.

BRIEF DESCRIPTION OF THE DRAWINGS

The following detailed description, given by way of example and not intended to limit the present disclosure solely thereto, will best be understood in conjunction with the accompanying drawings in which.

DETAILED DESCRIPTION

In the present disclosure, like reference numbers refer to like elements throughout the drawings, which illustrate various exemplary embodiments of the present disclosure.

The present disclosure is addressed to a contactless energy transfer system and method which uses high-intensity optical light sources rigidly-mounted at a stationary platform to transfer energy to a moving platform. The optical light sources are activated as the moving platform passes over the stationary platform. Photovoltaic modules mounted on the moving platform receive the light from the optical light sources and convert that light to electrical power. This conversion is done at the speed of light so the speed of the moving platform has no effect on the transfer of power from the stationary platform to the moving platform. The system and method of the present disclosure is applicable to systems in which the moving platform moves in a linear direction, where a series of stationary platforms may be installed at regular intervals along the linear pathway of the moving platform. The system and method of the present disclosure is also applicable to systems in which the moving platform rotates in a circular direction around a fixed axis with optical light sources positioned, for example, along the periphery of the moving platform.

Figure 1:
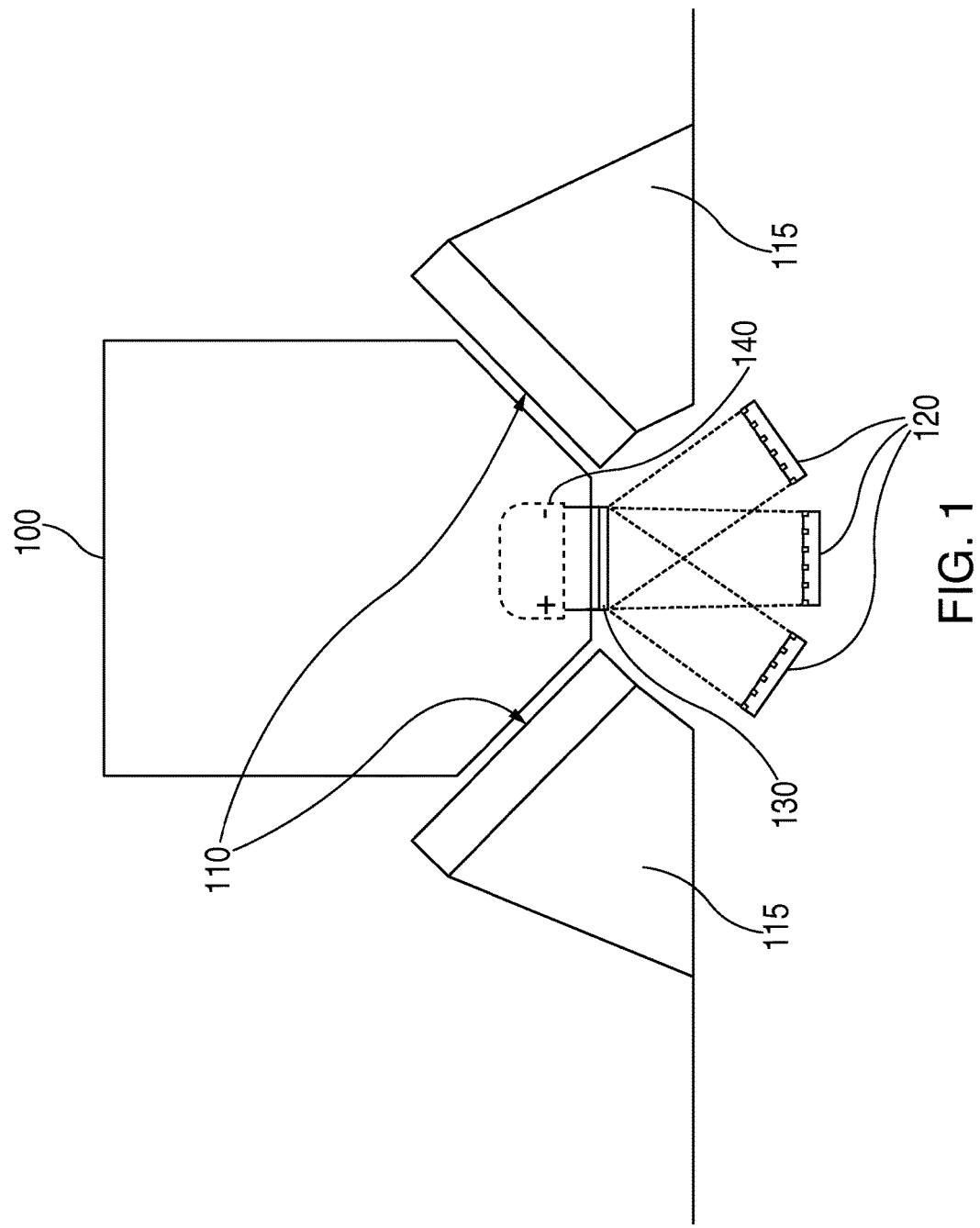
FIG. 1 is a first illustration of an embodiment of the contactless energy transfer system of the present disclosure for use in transferring energy to linearly-moving platforms.

Referring now to FIG. 1, a moving platform 100 which moves in a linear direction is shown in a cross-sectional view positioned over a levitation mechanism 110 coupled to a stationary platform 115. Moving platform 100 may, for example, correspond to a maglev train having no contact whatsoever with the stationary platform 115 that is positioned on or in contact with the ground. In FIG. 1, the contactless energy transfer system is shown in use with a maglev (or similar) type of train having no ground contact. However, it is important to note that the contactless energy transfer system of the present disclosure is also applicable to moving platforms which do include some amount of contact with the ground, including, for example, electric trains moving on fixed rails and electric cars. In the system shown in FIG. 1, a number of light sources 120 are positioned adjacent to stationary platform 115 beneath the pathway for moving platform 100. Light sources 120 may preferably be high-efficiency light sources such as lasers, LEDs, flash lamps and arc lamps. Each of the light sources 120 is positioned to direct light upwards towards a spot where a photovoltaic module 130 (or a series of photovoltaic modules 130) mounted on moving platform 100 will be positioned as moving platform 100 moves over such light sources 120. Photovoltaic modules 130 are preferably high-efficiency type devices such as laser power converters (including Laser Power Converter products from Spectrolab Inc.), multi-junction solar cells and silicon-based solar cells. Each photovoltaic module 130 is electrically coupled to an energy storage system 140, e.g., a battery or large capacitor (and associated electronic circuitry) on moving platform 100 to store the energy generated by reception of the light from light sources 120. The energy stored in energy storage system 140 is used to power systems within moving platform 100 via connections to energy storage system which are not shown in FIG. 1. Although a single photovoltaic module 130 is shown in FIG. 1, photovoltaic module 130 may include a plurality of separate photovoltaic modules connected serially and/or in parallel in order to generate a desired voltage and current output from photovoltaic module 130.

Figure 2:
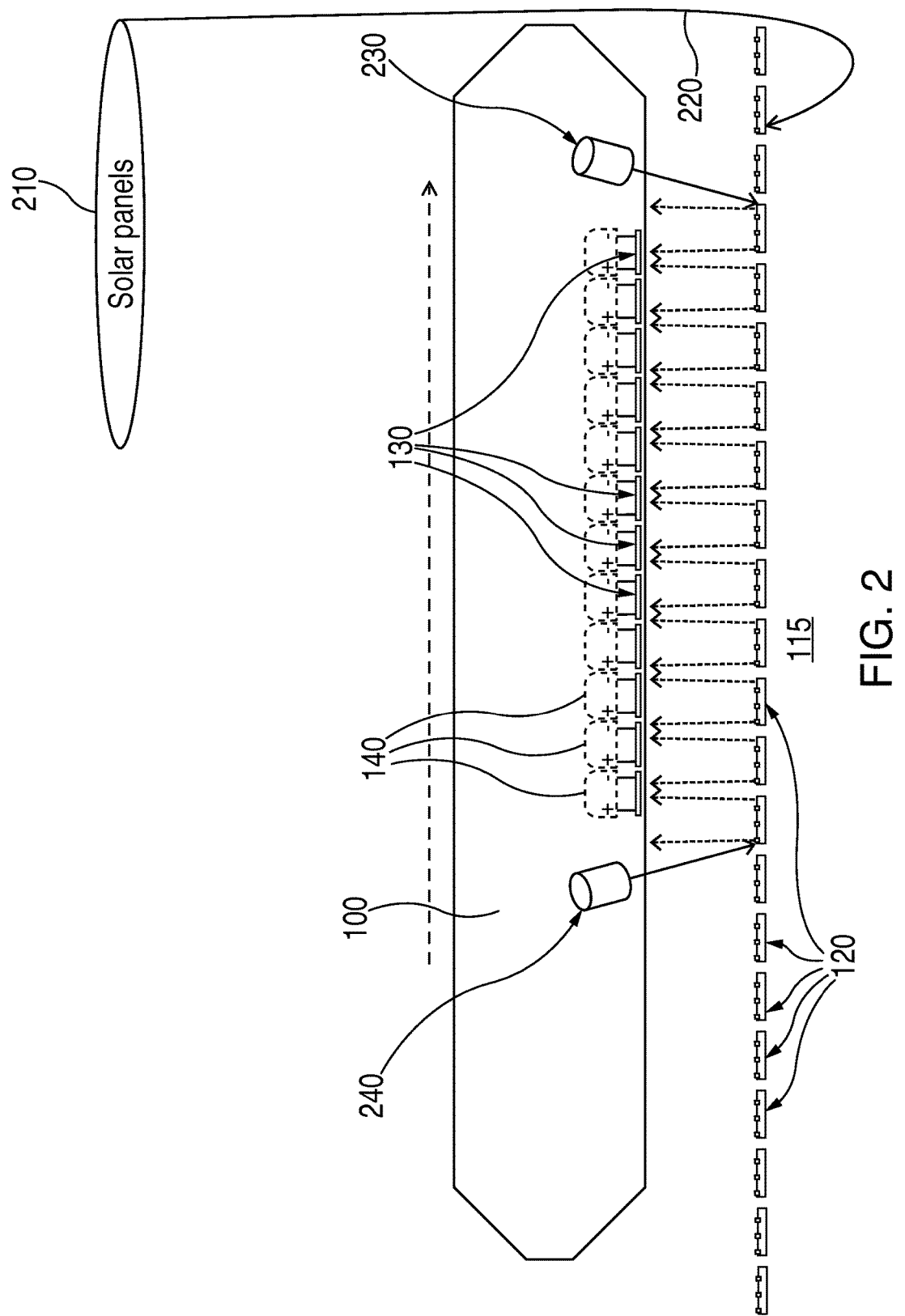
FIG. 2 is a second illustration of an embodiment of the contactless energy transfer system of the present disclosure for use in transferring energy to linearly-moving platforms.

Referring now to FIG. 2, a side view of the stationary platform 115 and moving platform 100 is shown. A series of optical light sources 120 are shown mounted below the pathway of moving platform 100. The optical light sources 120 receive power from a central power source 210 via a connection 220. In FIG. 2, the central power source 210 is shown as a solar panel collection system (e.g., a system which may include one or more solar panel modules and one or more associated batteries and electronic systems). However, in other embodiments, central power source 210 may be connected directly to a power grid to receive electrical power. Moving platform 100 may include a series of one or more photovoltaic modules 130, which are shown each coupled to a separate energy storage device 140 in FIG. 2. As one of ordinary skill in the art will readily recognize, the photovoltaic modules 130 may be coupled in other ways to energy storage devices 140 as known in the art. The light sources 120 are configured to activate and emit high-intensity light as the moving platform 100 moves over the light sources 120. In one embodiment, this is accomplished by including a first signal transmitter 230 at the front end of moving platform 100 which transmits a signal instructing the light sources 120 to activate (turn on to emit light) and a second signal transmitter 240 at the rear end of moving platform 100 which transmits a signal instructing the light sources 120 to deactivate (turn off to stop emitting light). One or more associated receivers (not shown in FIG. 2) are either integrated into each light source 120 or are coupled to each light source 120. The associated receivers receive the signals from first and second signal transmitters 230, 240 and control the activation and deactivation of the light sources 120. In one alternative embodiment, the second signal transmitter 240 may be omitted and the associated light receivers may be configured to activate each of the light sources 120 for a predetermined time interval upon receipt of the activation signal from signal transmitter 230. In another alternative embodiment, sensors may be provided which are coupled to each light source 120 to detect that the moving platform 100 is in close proximity to stationary platform 115 (e.g., moving through stationary platform 115) and to activate the associated light source (or sources) 120 while moving platform 100 remains in close proximity to moving platform 100. This allows the light sources 120 to be activated only when necessary (i.e., when the moving platform 100 is above light sources 120) without the need for a signal transmitter mounted on moving platform 100. In still another alternative embodiment, the light sources 120 may be activated manually, e.g., by use of a switch coupled to each light source 120.

By using light sources 120 which are only activated as the moving platform 100 moves through the stationary platform 115 and over such light sources 120, a high degree of energy conversion efficiency can be obtained in transferring power to moving platform 100, without any physical contact between the moving platform 100 and the power source at stationary platform 115. The duration of activation of each light source 120 can be scaled to match the speed of the moving platform 100 at acceleration, full speed travel and deceleration speeds to aid in improving conversion efficiency.

The contactless energy transfer system and method shown with respect to FIGS. 1 and 2 is addressed to transferring energy to a moving platform 100 which moves in a generally linear fashion (e.g., a maglev train). Other types of systems appropriate for contactless energy transfer are rotary in nature and have some sort of low friction cushion or levitation mechanism (e.g., magnetic) that requires no physical contact between the stationary platform and the rotary platform or which may include limited physical contact such as a rotating axle coupled to a drive motor.

Figure 3:
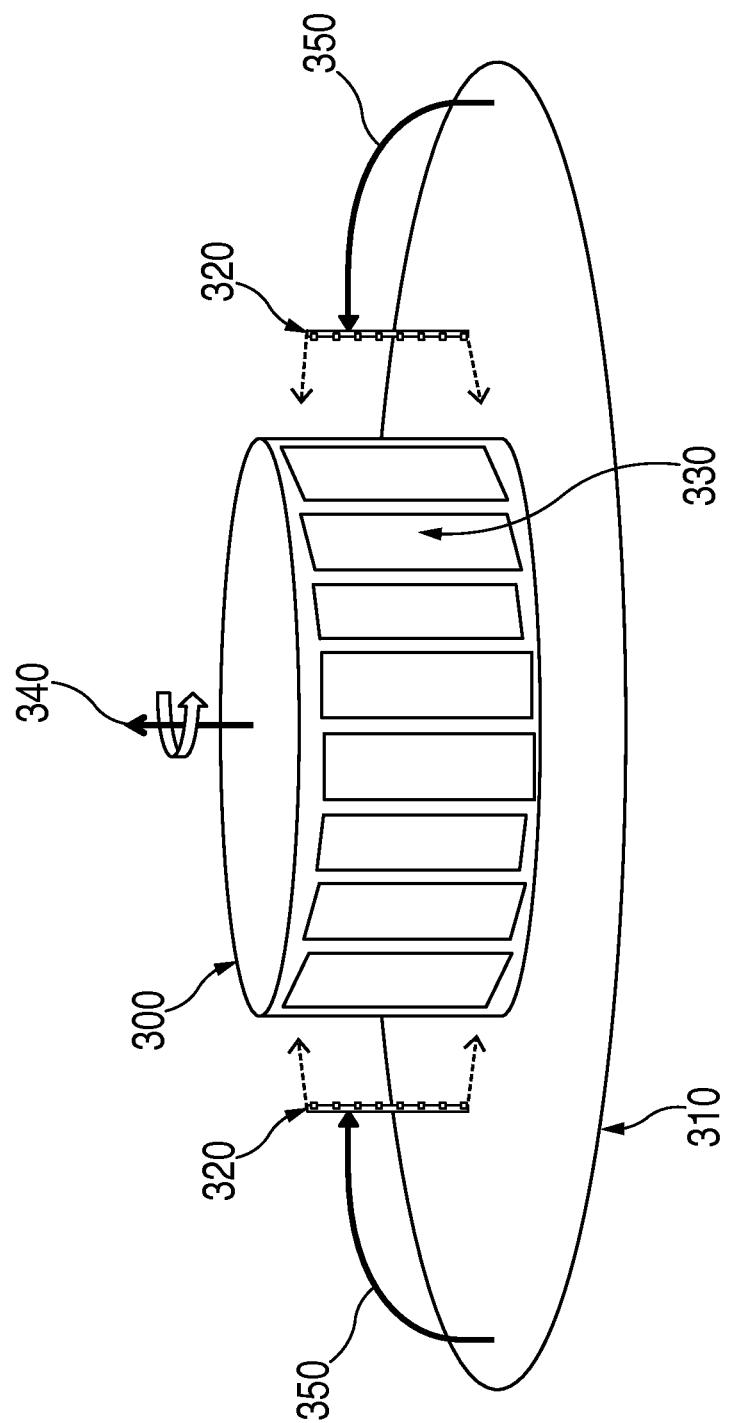
FIG. 3 is a first illustration of an embodiment of the contactless energy transfer system of the present disclosure for use in transferring energy to rotary-moving platforms.
Figure 4:
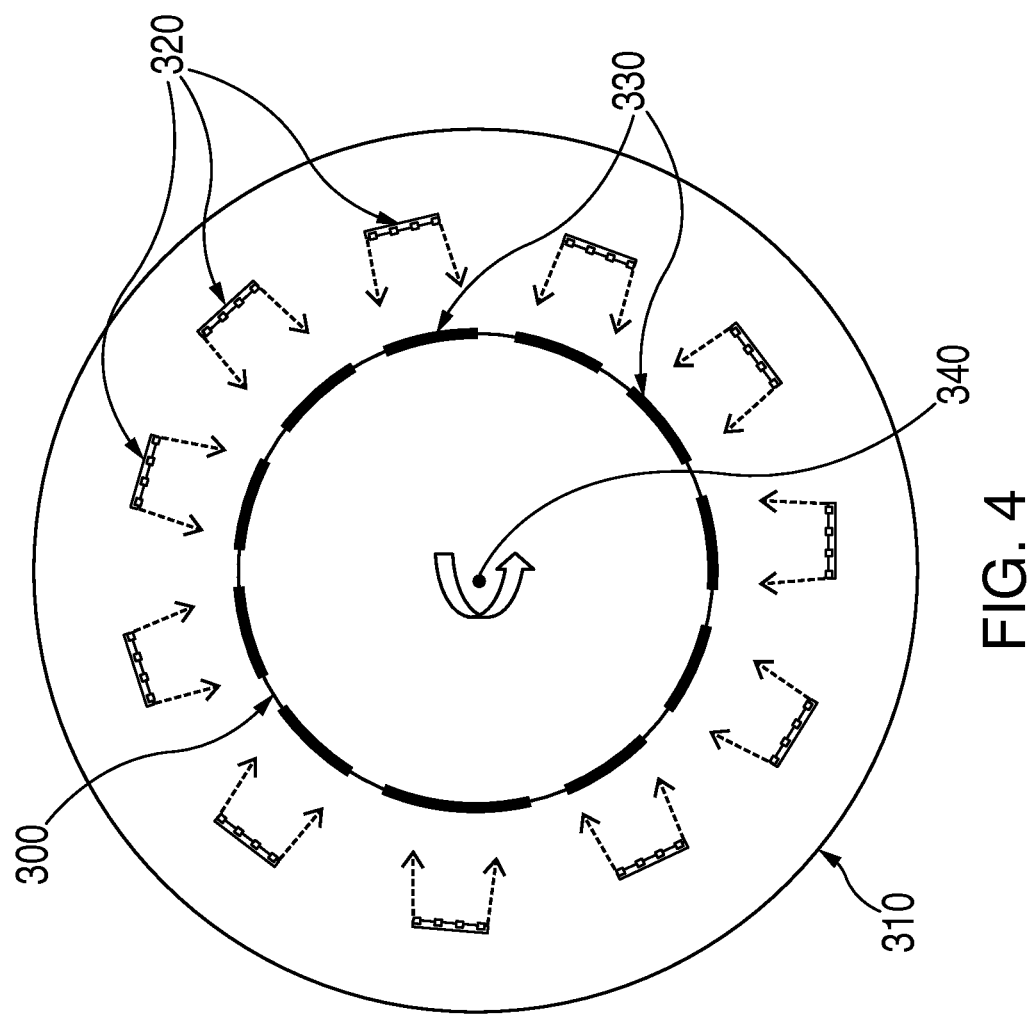
FIG. 4 is a second illustration of an embodiment of the contactless energy transfer system of the present disclosure for use in transferring energy to rotary-moving platforms.

Referring now to FIGS. 3 and 4, an embodiment of a contactless energy transfer system and method applied to a rotary system is shown. FIG. 3 is a perspective front view and FIG. 4 is a top view of such system. In particular, a rotating platform 300 rotates around an axis 340 in proximity to a stationary platform 310. In some embodiments, rotating platform 300 may be coupled to a fixed axle along axis 340 that is coupled to a drive motor to spin rotating platform 300. This requires some contact between rotating platform 300 and stationary platform 310, but with this contact in constant motion as the rotating platform 300 spins. In other embodiments, rotating platform 300 may be coupled to a magnetic levitation system or the like which spins rotating platform 300 without any contact between rotating platform 300 and stationary platform 310. For the system shown in FIGS. 3 and 4, a plurality of photovoltaic modules 330 are positioned around the periphery of the cylinder forming rotating platform 300, each of the photovoltaic modules 330 is coupled to an energy storage system within rotating platform 300, not shown in FIG. 3. As with the embodiment shown in FIG. 1, the energy storage system may be, for example, a battery or large capacitor (and associated electronic circuitry) configured store the energy generated by reception of light at each photovoltaic module 330. Depending on the particular application, there may be a single energy storage system coupled to all of the photovoltaic modules 330, there may be multiple energy storage systems coupled to a group of the photovoltaic modules 330, or there may be a separate energy storage system for each of the photovoltaic modules 330. In addition, a plurality of light sources 320 are positioned around the periphery of the rotating platform 300 in a fixed position on stationary platform 310, each light source 320 positioned to direct light against the photovoltaic modules 330 on rotating platform 300. Only two light sources 320 are shown in FIG. 3 to aid in showing the other parts of the system, but, as shown in FIG. 4, light sources 320 may preferably be positioned in a ring around the periphery of rotating platform 300. As one of ordinary skill in the art will readily recognize, the number of light sources 320 and the number of photovoltaic modules 330 is determined based on the amount of energy transfer desired, a smaller number being required for a low level of energy transfer and a greater number being required for a higher level of transfer. One of ordinary skill in the art will also recognize that other factors influence the amount of energy transfer as well, including the illumination output of each light source 320 and the efficiency of each photovoltaic module 330. Each light source 320 is coupled to a power source (not shown) via a conductor 350. As with the embodiment shown in FIG. 1, the power source may be, for example an energy storage system coupled to an array of solar panel modules or a direct connection to the power grid. In this case, the light sources 320 may be operated continuously to provide a constant source of power to rotating platform 300 or, in the alternative and depending on the application, may be switched on and off at predetermined intervals selected to ensure that a certain minimum amount of energy is maintained within the energy storage system in rotating platform 300. In this manner, power may be transferred from the stationary platform 310 to the rotating platform 300 without any direct contact whatsoever. This system is thus not subject to wear and the consequent limited lifetime due to contact between the fixed and moving surfaces required to transfer energy in prior energy transfer systems.

Figure 5:
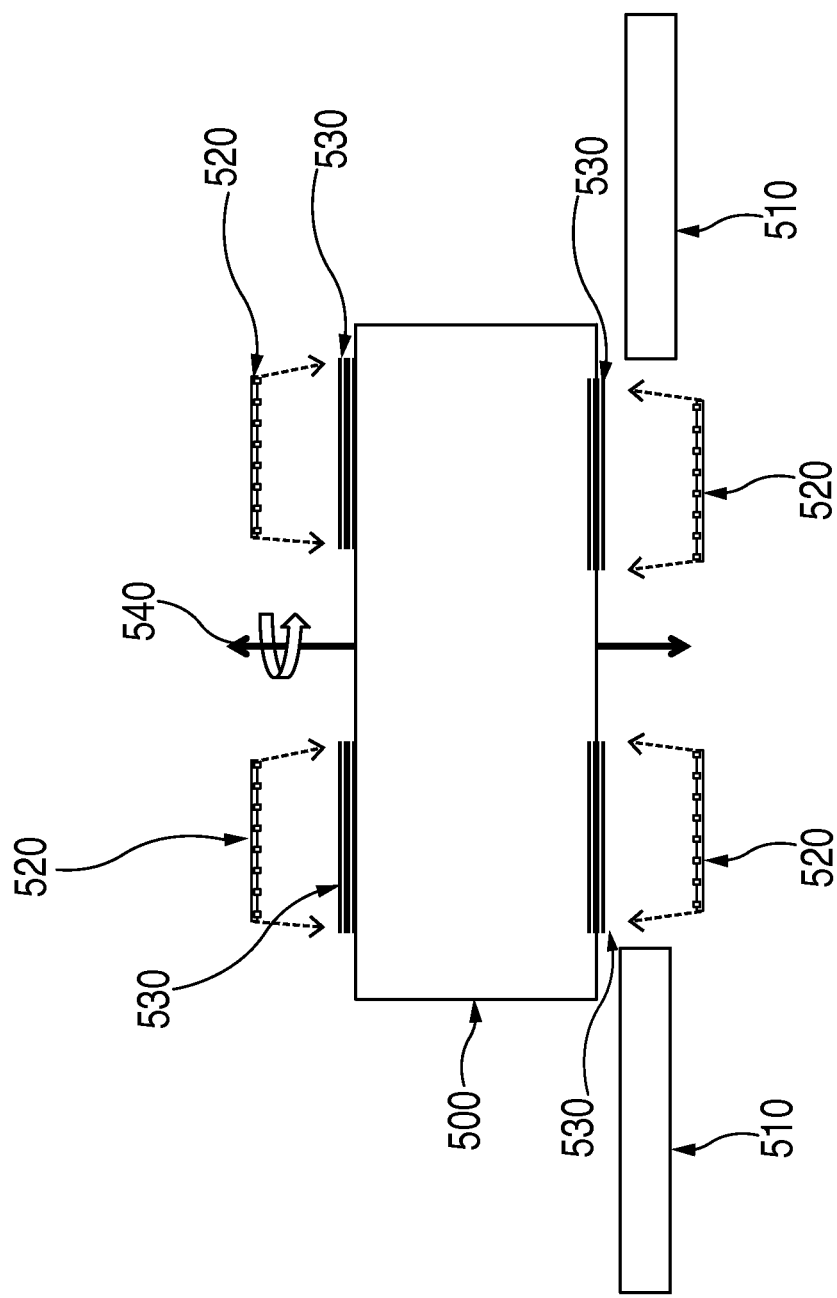
FIG. 5 is an illustration of an alternative embodiment of the contactless energy transfer system of the present disclosure for use in transferring energy to rotary-moving platforms.

Referring now to FIG. 5, an alternative embodiment of a contactless energy transfer system and method applied to a rotary system is shown. In this embodiment, a rotating platform 500 rotates around an axis 540 in proximity to a stationary platform 510. The mechanism for moving rotating platform 500 is not shown. In this embodiment, photovoltaic modules 530 are preferably placed on an upper and a lower surface of the rotating platform 500, instead of around the periphery as in the embodiment shown in FIGS. 3 and 4. In other alternative embodiments, the photovoltaic modules 530 may be placed only on the upper surface of rotating platform 500 or only on the lower surface of rotating platform 500. The photovoltaic modules 530 are coupled to an energy storage system within rotating platform 500 in the same manner as with the embodiment of FIGS. 3 and 4. In addition, light sources 520 may be positioned above and below rotating platform 500 to direct light directly against each photovoltaic modules 530. In other alternative embodiments, light sources 520 may be only positioned above rotating platform 500 when the photovoltaic modules 530 are only positioned on the upper surface of rotating platform 500 or may be only positioned below rotating platform 500 when the photovoltaic modules 530 are only positioned on the lower surface of rotating platform 500. Depending on the application, light sources 520 may be activated at all times to provide a constant source of energy to the energy storage system coupled to each photovoltaic module 530 or may be turned on and off at predetermined intervals to ensure that the energy storage system coupled to each photovoltaic module 530 maintains a certain amount of energy therein.

Figure 6:
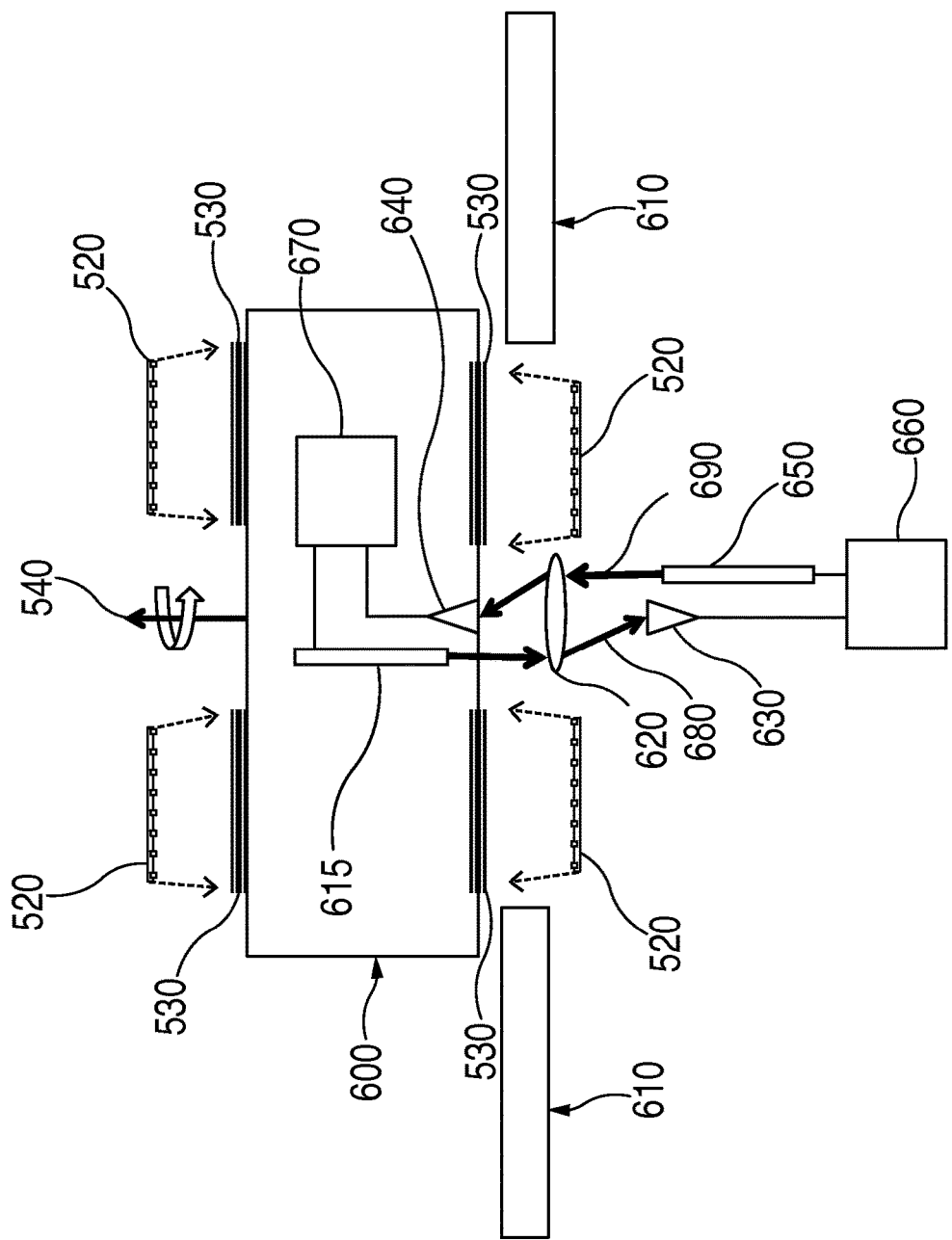
FIG. 6 is an illustration of an embodiment of a contactless communications system of the present disclosure for use in communicating with rotary-moving platforms.

Referring now to FIG. 6, in some circumstances, it is desirable to transmit data between a rotating platform 600 and a stationary platform 610. Rotating platform 600 may include a second communication circuit 670 coupled to a rotating light source 615 and to a rotating light detector 640. The light source 615 is offset from the center axis 540 of rotating platform 600, while the light detector 640 is aligned coincident with the center axis 540. Stationary platform 610 may also include a first communication circuit 660 which is coupled to a stationary light source 650 and a stationary light detector 630. The light source 650 is also offset from the center axis 540 of rotating platform 600, while the light detector 630 is aligned coincident with the center axis 540. A fixed lens 620 is positioned between rotating platform 600 and the stationary light source 650 and stationary light detector 630. Fixed lens 620 is centered at the axis of rotation 540 of rotating platform 600 at a fixed focal length. Fixed lens 620 is configured to receive the light from light source 615 as rotating platform 600 spins and direct such light at stationary light detector 630, as shown by light beam 680. Fixed lens 620 is also configured to receive the light from light source 650 and to direct such light at rotating light detector 640, as shown by light beam 690.

In operation, information in the form of a data stream to be transmitted from the rotating platform 600 to the stationary platform 610 may be received at second communication circuit 670 from a source not shown. Second communication circuit 670 may format such data for transmission and then forward such formatted information, in the form of a data stream, to rotating light source 615, for conversion from an electrical signal to a light signal. Light detector 630 receives and converts such light signal to an electrical signal that is forwarded to first communication circuit 660, for processing and transmission to circuits not shown in FIG. 6. Similarly, information in the form of a data stream to be transmitted from the stationary platform 610 to the rotating platform 600 may be received at first communication circuit 660 from a source not shown. First communication circuit 660 may format such data for transmission and then forward such formatted information, in the form of a data stream, to light source 650, for conversion from an electrical signal to a light signal. Light detector 640 is mounted on rotating platform 600 and thus rotates as rotating platform 600 spins around center axis 540. However, light detector 640 is aligned along the center axis 540 of rotating platform 600 and thus maintains a fixed position with respect to light source 650 and fixed lens 620 as rotating platform 600 spins. Light detector 640 receives and converts the light signal from light source 650 to an electrical signal that is forwarded to second communication circuit 670, for processing and transmission to circuits not shown in FIG. 6. The use of fixed lens 620 permits light from a moving rotating light source (i.e., light source 615) to be directed to a fixed light receiver (i.e., light detector 630) to allow for the transmission of information from the rotating platform 600 to the stationary platform 610, while also permitting information to be transmitted from the stationary platform 610 to the rotating platform 600 (via light source 650 and light detector 640).

The embodiment shown in FIGS. 1 and 2 has a moving platform 100 which receives energy via light reception and a stationary platform 115 that outputs energy in the form of light to moving platform 100. In some applications, it may be desirable to make the stationary platform that supplies an output light signal portable (and thus movable as well). In this alternative embodiment, the moving platform 100 becomes a first moving platform and the stationary platform 115 becomes a second moving platform. The second moving platform may include an internal power supply consisting of batteries coupled to solar panels, or may include batteries which can be charged in the same manner as an electrical vehicle, or may include batteries which can be charged by a generator fueled by gas or other types of fuel. In this situation, the light sources mounted on the second moving platform are preferably configured to activate as the second moving platform moves alongside the first moving platform.

Although the present disclosure has been particularly shown and described with reference to the preferred embodiments and various aspects thereof, it will be appreciated by those of ordinary skill in the art that various changes and modifications may be made without departing from the spirit and scope of the disclosure. It is intended that the appended claims be interpreted as including the embodiments described herein, the alternatives mentioned above, and all equivalents thereto.

What is claimed is:

1. A contactless energy transfer system comprising:
   a first platform having at least one light source coupled to a power source, the at least one light source configured to emit a light beam directed along a light path in a fixed direction; and
   a second platform, separate from the first platform, having at least one photovoltaic module, the at least one photovoltaic module coupled to an energy storage system coupled to the second platform such that light received at the at least one photovoltaic module is converted to electrical energy and stored in the energy storage system, the energy storage system configured to power electrical devices of the second platform, the second platform configured to cause the at least one photovoltaic module to move along a pathway, wherein the first platform includes a receiver unit configured to receive an activation signal, and wherein the at least one light source is configured to be selectively activated, in response to the activation signal, to emit the light beam during a first time period toward the at least one photovoltaic module when the pathway of the at least one photovoltaic module intersects with the light path.

2. The contactless energy transfer system of claim 1, wherein the first platform is stationary.

3. The contactless energy transfer system of claim 1, wherein the second platform is moveable and comprises one of a maglev train, an electric train, and an electric car.

4. The contactless energy transfer system of claim 1, wherein the second platform further includes a transmitter unit configured to transmit the activation signal.

5. The contactless energy transfer system of claim 4, wherein the receiver unit on the first platform is configured to deactivate the at least one light source in response to receiving a deactivation signal from the transmitter unit.

6. The contactless energy transfer system of claim 1, wherein the receiver unit on the first platform is configured to deactivate the at least one light source to cease outputting light after the first time period.

7. A contactless energy transfer system, comprising:
a first platform having at least one light source coupled to a power source, the at least one light source configured to emit a light beam directed along a light path in a fixed direction; and
a second platform, separate from the first platform, having at least one photovoltaic module, the at least one photovoltaic module coupled to an energy storage system coupled to the second platform such that light received at the at least one photovoltaic module is converted to electrical energy and stored in the energy storage system, the energy storage system is configured to power electrical devices of the second platform, the second platform configured to cause the at least one photovoltaic module to move along a pathway,
wherein the first platform includes a receiver unit configured to receive sensor data from a sensor indicating that the second platform is in close proximity to the first platform, and wherein the at least one light source is configured to be selectively activated, in response to the sensor data, to emit the light beam during a first time period toward the at least one photovoltaic module when the pathway of the at least one photovoltaic module intersects with the light path.

8. The contactless energy transfer system of claim 1, wherein each of the at least one light source comprises a high-intensity light source.

9. The contactless energy transfer system of claim 1, wherein each of the at least one photovoltaic module comprises one or more laser power converters.

10. A contactless energy transfer system comprising:
a first platform having at least one light source coupled to a power source, the at least one light source configured to emit a light beam directed along a light path in a fixed direction; and
a second platform, separate from the first platform, having at least one photovoltaic module, the at least one photovoltaic module coupled to an energy storage system coupled to the second platform such that light received at the at least one photovoltaic module is converted to electrical energy and stored in the energy storage system, the energy storage system is configured to power electrical devices coupled to the second platform, the second platform configured to rotate around a fixed axis along a pathway; and
wherein the at least one light source is positioned and configured to direct light at the at least one photovoltaic module during rotation of the second platform around the fixed axis when the pathway of the at least one photovoltaic module intersects with the light path.

11. The contactless energy transfer system of claim 10, wherein the second platform is cylindrically shaped and has an axis coincident with the fixed axis, wherein the at least one photovoltaic module is positioned on an outer periphery of the second platform, and wherein the at least one light source is positioned outside the outer periphery such that light output from the at least one light source is directed at the at least one photovoltaic module when the pathway of the at least one photovoltaic module intersects with the light path.

12. The contactless energy transfer system of claim 10, wherein the second platform has a surface perpendicular to the axis of rotation, wherein the at least one photovoltaic module is positioned on the surface of the second platform perpendicular to the axis of rotation, and wherein the at least one light source is positioned such that light output from the at least one light source is directed at the at least one photovoltaic module when the pathway of the at least one photovoltaic module intersects with the light path.

13. The contactless energy transfer system of claim 10, wherein each of the at least one light source is configured to output light during rotation of the second platform.

14. The contactless energy transfer system of claim 10, wherein each of the at least one light source is configured to output light during one or more time intervals during rotation of the second platform.

15. The contactless energy transfer system of claim 10, wherein the second platform is coupled to a magnetic levitation system for rotating the second platform around the fixed axis.

16. The contactless energy transfer system of claim 10, wherein each of the at least one photovoltaic module comprises one or more laser power converters.

17. The contactless energy transfer system of claim 10, wherein the first platform further comprises a first communications circuit, a first light detector coupled to the first communications circuit and centrally aligned with the fixed axis of the second platform, a fixed lens mounted perpendicular to and centrally aligned with the fixed axis of the second platform, the fixed lens positioned between the first light detector and the second platform, wherein the second platform further comprises a second communications circuit and a second light source coupled to the second communications circuit, the second light source mounted at a fixed distance from the fixed axis of the second platform, the second light source positioned to direct light though the fixed lens, wherein the fixed lens is configured to direct the light from the second light source to the first light detector, and wherein the second communications circuit is configured to provide data to the second light source; and wherein the first communications circuit is configured to receive the data from the first light detector.

18. The contactless energy transfer system of claim 10, wherein the first platform further comprises a first communications circuit, a first light source coupled to the first communications circuit and mounted at a fixed distance from the fixed axis of the second platform, a fixed lens mounted perpendicular to and centrally aligned with the fixed axis of the second platform, the fixed lens positioned between the first light source and the second platform, the first light source positioned to direct light though the fixed lens, wherein the second platform further comprises a second communications circuit and a second light detector coupled to the second communications circuit, the second light detector centrally aligned with the fixed axis of the second platform, wherein the fixed lens is configured to direct the light from the first light source to the second light detector, wherein the first communications circuit is configured to provide data to the first light source and wherein the second communications circuit is configured to receive the data from the second light detector.

19. A method of contactless energy transfer from a stationary platform to a moving platform, the moving platform configured to move one or more photovoltaic modules along a path, the method comprising:

receiving an activation signal indicating that the moving platform is in close proximity to the stationary platform;

in response to receiving the activation signal, selectively activating one or more light sources coupled to the stationary platform to output a light beam along a light path in a fixed direction when the path of one of the one or more of the photovoltaic modules intersect the light path;

receiving light output from the one or more light sources on the stationary platform at the one or more photovoltaic modules coupled to the moving platform;

converting the received light to electrical energy at the one or more photovoltaic modules coupled to the moving platform;

storing the electrical energy in an energy storage system on the moving platform; and powering electrical devices of the moving platform using the electrical energy stored in the energy storage system.

20. The method of contactless energy transfer of claim 19, wherein the activation signal is generated by a sensor or receiver unit coupled to the stationary platform or the moving platform.

* * * * *